United States Patent
Albright

(10) Patent No.: US 7,038,711 B2
(45) Date of Patent: May 2, 2006

(54) AUDIO PROCESSING USING A VIDEO RASTERIZER

(75) Inventor: Evan Albright, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 536 days.

(21) Appl. No.: 10/359,866

(22) Filed: Feb. 7, 2003

(65) Prior Publication Data
US 2004/0155964 A1    Aug. 12, 2004

(51) Int. Cl.
*H04N 17/00* (2006.01)

(52) U.S. Cl. .................................. 348/180; 348/185

(58) Field of Classification Search .............. 348/180, 348/184, 564, 185, 177, 484, 569, 186, 563, 348/512, 515; 345/134; H04N 17/00, 17/02, H04N 17/04
See application file for complete search history.

(56) References Cited

U.S. PATENT DOCUMENTS

| | | | |
|---|---|---|---|
| 5,485,199 A | 1/1996 | Elkind et al. | |
| 6,219,094 B1 * | 4/2001 | Gerlach et al. | 348/184 |
| 6,275,257 B1 * | 8/2001 | Tallman et al. | 348/185 |

* cited by examiner

*Primary Examiner*—Sherrie Hsia
(74) *Attorney, Agent, or Firm*—Francis I. Gray

(57) ABSTRACT

Audio processing using a video rasterizer allows simultaneous display of both audio and video data on the same raster display. Audio samples are clocked into a buffer memory, such as a first-in, first-out (FIFO) buffer, by an audio clock and clocked out of the buffer memory by a rasterizer (system) clock to allow the audio data to cross over from the audio clock domain to the video clock domain. The audio data is then upsampled by a sample ratio converter/interpolator before being processed by a video display engine. The video display engine includes a polyphase filter for upsampling display data for input to a rasterizer from which the data is read for display.

10 Claims, 4 Drawing Sheets he present invention relates to audio/video test and measurement, and more particularly to audio processing using a video rasterizer for displaying representative waveforms.

AUDIO PROCESSING USING A VIDEO RASTERIZER

BACKGROUND OF THE INVENTION

The present invention relates to audio/video test and measurement, and more particularly to audio processing using a video rasterizer for displaying representative waveforms.

In a video instrument, such as a video waveform monitor or vectorscope, the video data is sampled at a high data rate, such as 27 MHz. Therefore a system clock is used in the instrument which has a frequency that is an integer multiple of the video data rate. For raster scan displays the video data is stored in a rasterizer. The contents of the rasterizer are readout for display at a rate such that the display is updated usually thirty times per second. In contrast audio data is sampled at a much lower rate than the video data rate, such as 48 kHz. To provide a waveform display of the audio data conventionally requires separate equipment having circuitry designed for audio data rates.

U.S. Pat. No. 5,485,199 by Bob Elkind et al entitled "Digital Audio Waveform Display on a Video Waveform Display Instrument", issued Jan. 16, 1996, stores digital audio data in a small buffer memory and replaces bursts of video data through a digital-to-analog converter (DAC) running at the video sample rate. This super-clocking of the digital audio data to the video data rate works well with analog waveform display technology, since the DAC reconstruction filter interpolates the audio data as if it were at the digital sample rate. Therefore a single DAC and filter may be used to combine audio waveforms with video waveforms for simultaneous display of the interpolated digital data.

Prior digital audio waveform monitors generate a raster display by writing to a dedicated frame buffer read by a display controller at a display frame rate. A video waveform monitor generates frames for the display in a similar manner, but at a much higher clock frequency and pixel rate. To combine video and audio waveforms in the same platform has required separate buffers for building the audio and video histograms.

What is desired is a method of simultaneously displaying audio and video data using a shared display technique without discarding any data.

BRIEF SUMMARY OF THE INVENTION

Accordingly the present invention provides audio processing using a video rasterizer. Audio samples are clocked into a buffer memory, such as a first-in, first-out (FIFO) buffer, by an audio clock and clocked out of the buffer memory by a rasterizer (system) clock to allow the audio data to cross over from the audio clock domain to the video clock domain. The audio data is then upsampled by a sample ratio converter/interpolator before being processed by a video display engine. The video display engine includes a polyphase filter for upsampling display data for input to a rasterizer from which the data is read for display. In this way both audio and video data use the same display technique to allow simultaneous display of both audio and video data on the same raster display.

The objects, advantages and other novel features of the present invention are apparent from the following detailed description when read in conjunction with the appended claims and attached drawing.

DETAILED DESCRIPTION OF THE INVENTION

Figure 1:
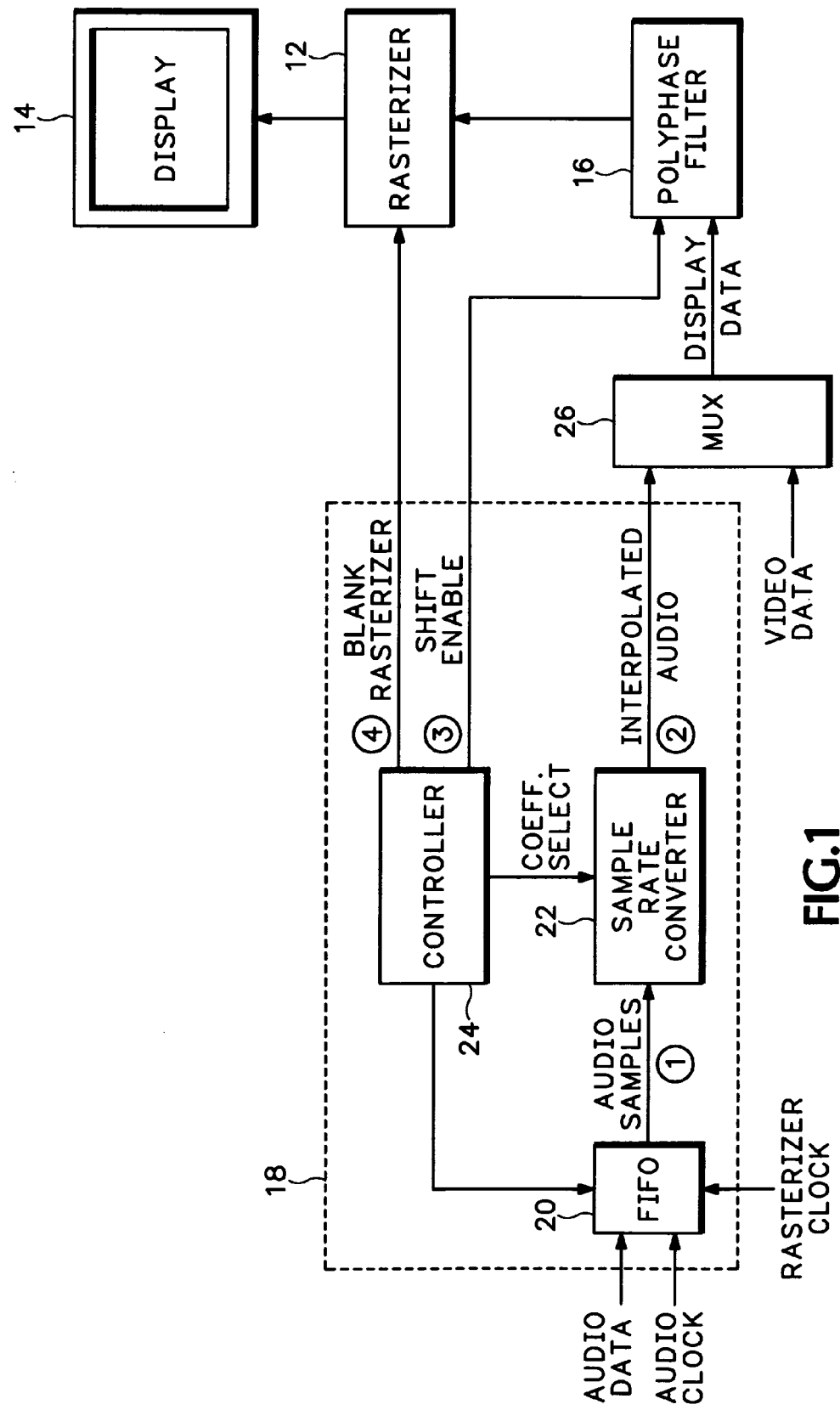
FIG. 1 is a block diagram view of an audio/video display engine according to the present invention.

Referring now to FIG. 1 a conventional video rasterizer 12 is shown having an output coupled to a display 14 and an input coupled to a polyphase filter (interpolator) 16. The polyphase filter 16 may be a two-tap, 512 phase interpolator. An audio processor 18 receives audio data at an audio clock rate in a buffer memory 20, such as a first-in, first-out (FIFO) buffer. When the FIFO 20 is ready, the audio data are read out at a system/rasterizer clock rate that is an integer multiple of the video sampling rate and input to a sample ratio converter 22 that acts, for example, as an eight-phase interpolator. A controller 24 provides read addresses for the FIFO 20, a blanking signal to the rasterizer 12, a shift enable signal to the polyphase filter 16 and coefficient selection to the sample ratio converter 22. The interpolated audio data from the sample ratio converter 22 and video data are input to a multiplexer 26. The output of the multiplexer 26 is display data that is input to the polyphase filter 16. Thus the display technique after the multiplexer 26 is common for both audio and video data.

The audio data, to be treated simply as another set of video data, crosses into the video clock domain. The FIFO 20 is used for crossing clock boundaries that are significantly different, as is the case between audio and video data. The controller 24 blanks the display 14 during periods of time when the audio data is invalid, usually resulting from the fact that the video processing clock is not an integer multiple of the audio data rate. The controller 24 also allows the polyphase filter 16 to shift in new data. If the ratio of audio data rate to the audio bandwidth is not greater than the ratio that is expected at the polyphase filter 16, i.e., the video data has been upsampled, the sample ratio converter 22 is used to increase the audio data rate. The polyphase filter 16 is used to perform the final upsampling, resulting in a final sample rate increase hundreds of times over the original audio data rate, compared to two, four or eight times upsampling found in similar audio waveform monitors. Simultaneous audio and/or video waveforms may be displayed by replicating the multiplexer 26 and the polyphase filter 16.

Figure 2:
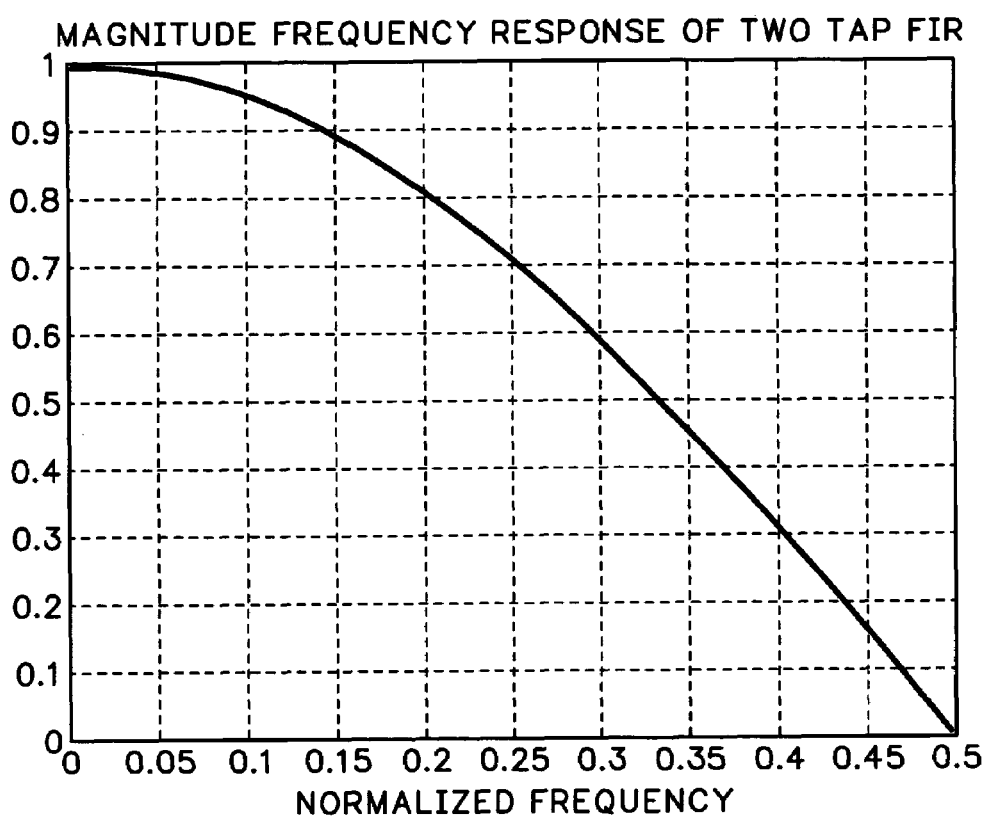
FIG. 2 is a graphic view of a normalized response for a two-tap polyphase filter.
Figure 3:
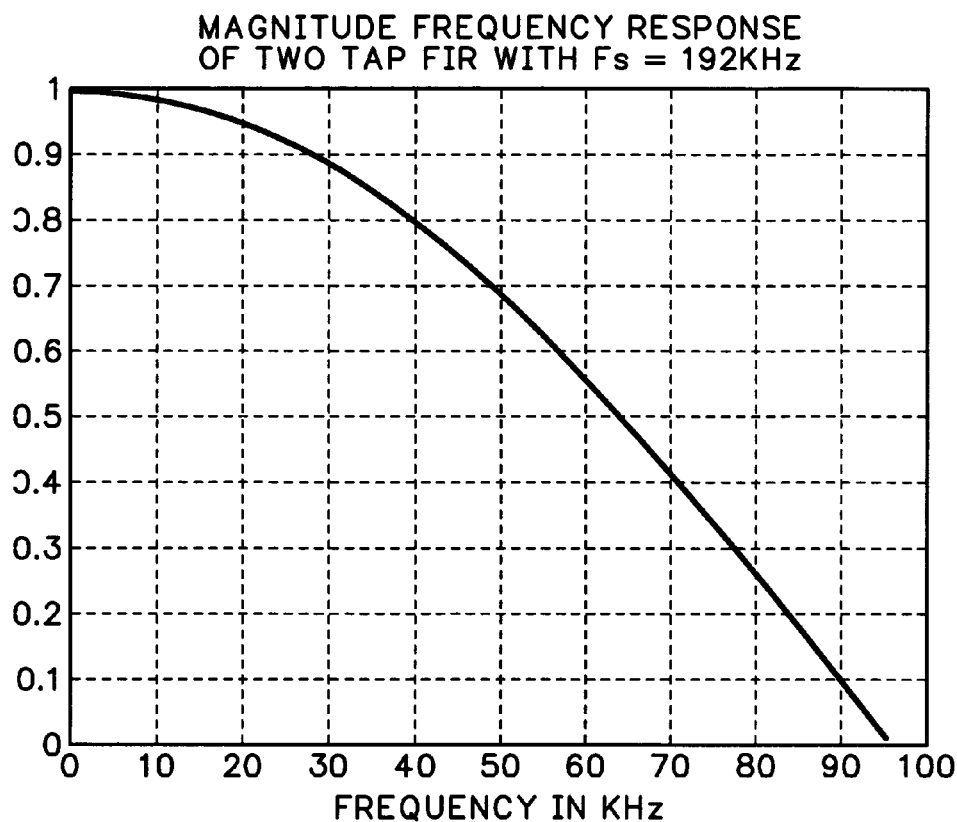
FIG. 3 is a graphic view of a response for a two-tap polyphase filter with an audio sample rate.
Figure 4:
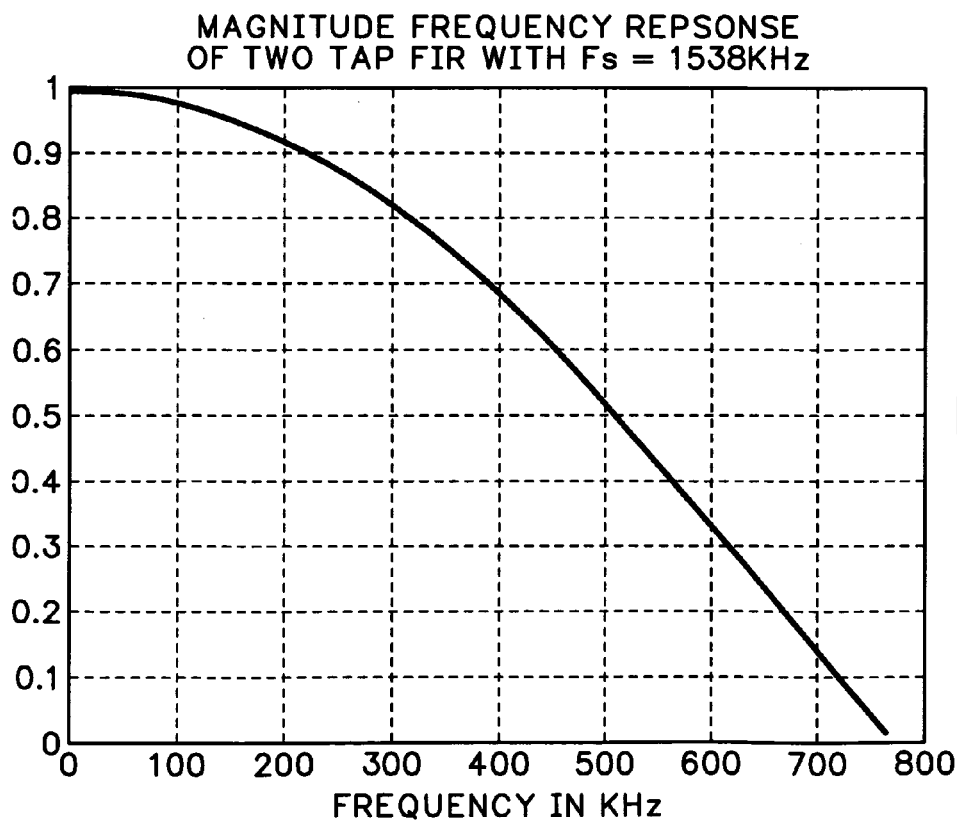
FIG. 4 is a graphic view of a response for a two-tap polyphase filter with a rasterizer sample rate.

The frequency response of a digital filter is directly related to the sample rate of the data being sampled. As a result doubling the sample rate of a filter doubles the bandwidth. Often digital filter frequency response plots are plotted with the X-axis normalized to indicate that the absolute frequency response is only known after the sampling rate is specified. FIG. 2 shows a typical normalized frequency response of a two-tap finite impulse response (FIR) filter. The absolute frequency response is calculated by multiplying the X-axis by the sample rate of the data to be filtered. FIG. 3 shows a frequency response plot for the same filter with a sample rate of 192 kHz. The frequency response at 20 kHz is approximately attenuated by 5%. FIG. 4 shows a result of interpolating the data by eight, resulting in a sample rate increase of eight, with the same two-tap FIR filter. The frequency response attenuation at 20 kHz is negligible in FIG. 4 with a sample rate of 1536 kHz compared to FIG. 3 with a sample rate of 192 kHz.

As a specific illustration a two-tap 512 phase polyphase filter is used as the polyphase filter 16 for rasterization. To have the desired frequency response the audio data is interpolated by eight before being sent to the polyphase filter 16. The interpolation may avoided if the two-tap filter is extended to a larger filter length. But since the data rate is much slower than the system clock rate, the 8× interpolation may be performed with a single multiplier and a 64 coefficient look-up table compared to extending the two-tap filter to 10 taps with the attendant cost of eight multipliers and eight 512 coefficient look-up tables. Since all the other measurement modes only need the two-tap filter, there is no benefit to altering it. In this way the video display engine is unchanged when adding the audio processing to it to become an audio/video display engine.

Figure 5:
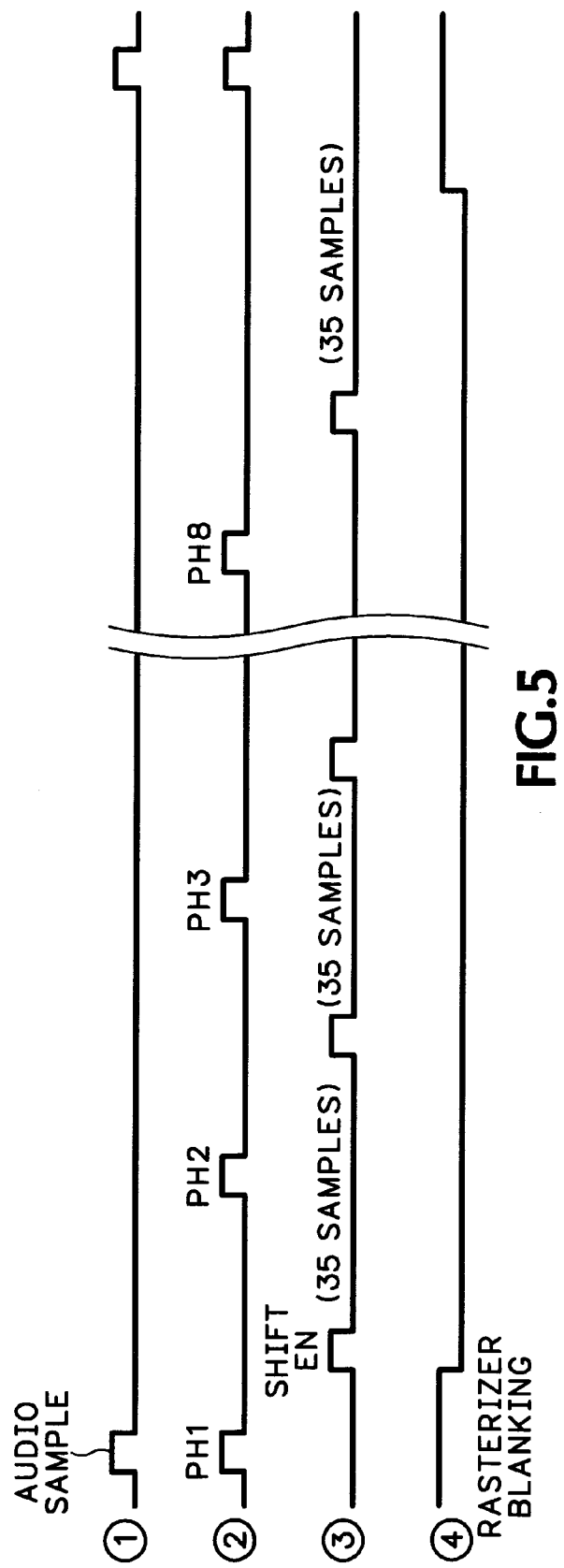
FIG. 5 is a timing diagram view for the audio/video display engine of FIG. 1 according to the present invention.

Referring now to the Table below and the timing diagram of FIG. 5 a state machine is used to control the number of points generated from the polyphase filter 16 for each input audio data sample. In this particular instance the audio data is first interpolated by eight by the sample ratio converter 22 before being input to the polyphase filter 16. The total number of cycles that are available to calculate output values is equal to the system clock divided by the input audio clock. In this example the system clock is 54 MHz and the audio clock is 192 kHz, yielding approximately 281 system clocks between audio data samples. In an ideal system where there are no processing delays this example indicates that there is an interpolated value being generated from the 8× interpolator 22 approximately once every 35 system clocks (281/8). Each time a value is output from the interpolator 22 it is shifted into the polyphase filter 16. The coefficients of the polyphase filter 16 are constantly varying, resulting in 35 interpolated points for each of the eight interpolated points, resulting in a total of 280 values being generated for each input audio data sample.

| State | Action |
|---|---|
| 0 | Blank rasterizer display. Transition to State 1 when an audio sample arrives. |
| 1 | Calculate Phase 1 of the 8x interpolator then transition to State 2. |
| 2 | Shift the Phase 1 value into the polyphase filter. Wait 35 system clocks to allow the polyphase filter to generate 35 values, then transition to State 3. During the 35 system clocks calculate Phase 2 of the 8x interpolator. |
| 3 | Shift the Phase 2 value into the polyphase filter. Wait 35 system clocks to allow the polyphase filter to generate 35 values, then transition to State 4. During the 35 system clocks calculate Phase 3 of the 8x interpolator. |
| 4 | Shift the Phase 3 value into the polyphase filter. Wait 35 system clocks to allow the polyphase filter to generate 35 values, then transition to State 5. During the 35 system clocks calculate Phase 4 of the 8x interpolator. |
| 5 | Shift the Phase 4 value into the polyphase filter. Wait 35 system clocks to allow the polyphase filter to generate 35 values, then transition to State 6. During the 35 system clocks calculate Phase 5 of the 8x interpolator. |
| 6 | Shift the Phase 5 value into the polyphase filter. Wait 35 system clocks to allow the polyphase filter to generate 35 values, then transition to State 7. During the 35 system clocks calculate Phase 6 of the 8x interpolator. |
| 7 | Shift the Phase 6 value into the polyphase filter. Wait 35 system clocks to allow the polyphase filter to generate 35 values, then transition to State 8. During the 35 system clocks calculate Phase 7 of the 8x interpolator. |
| 8 | Shift the Phase 7 value into the polyphase filter. Wait 35 system clocks to allow the polyphase filter to generate 35 values, then transition to State 9. During the 35 system clocks calculate Phase 8 of the 8x interpolator. |
| 9 | Shift the Phase 8 value into the polyphase filter. Wait 35 system clocks to allow the polyphase filter to generate 35 values, then transition to State 0. |

Therefore for each input audio sample eight phases are generated by the sample ratio converter 22, with each phase being upsampled by 35 by the polyphase filter 16, to produce the 280 display samples for each input audio sample.

Thus the present invention provides audio processing for a video waveform monitor using a video rasterizer by buffering input audio data and interpolating the audio data to provide upsampling for input to the video rasterizer which in turn has a polyphase filter for further upsampling the audio data.

What is claimed is:

1. An apparatus for displaying audio data at video data rates of the type having a polyphase filter for receiving display data and upsampling the display data for input to a display rasterizer further comprising:
   means for converting the audio data from an audio clock domain to a video clock domain; and
   means for interpolating the audio data from the converting means prior to input to the polyphase filter to produce interpolated audio data as the display data.

2. The apparatus as recited in claim 1 wherein the converting means comprises a buffer memory having the audio data clocked in at an audio clock rate and clocked out at a system clock rate in the video clock domain for input to the interpolating means.

3. The apparatus as recited in claim 1 or 2 wherein the interpolating means comprises a sample ratio converter having the audio data in the video clock domain as an input and providing the interpolated audio data as an output.

4. The apparatus as recited in claim 3 further comprising means for blanking the display rasterizer when the audio data is invalid.

5. The apparatus as recited in claim 1 or 2 further comprising means for blanking the display rasterizer when the audio data is invalid.

6. A method of simultaneously displaying audio and video data using a video display engine having a polyphase filter for upsampling display data and a rasterizer for storing the upsampled display data for display comprising the steps of:
   converting the audio data from an audio clock domain to a video clock domain; and
   upsampling the audio data in the video clock domain to produce interpolated audio data as the display data for input to the polyphase filter.

7. The method as recited in claim 6 further comprising the step of selecting between the upsampled audio and video data for input to the polyphase filter.

8. The method as recited in claim 6 or 7 wherein the converting step comprises the steps of:
   clocking the audio data into a buffer memory at an audio clock rate; and clocking the audio data from the buffer memory at a system clock rate in the video clock domain for input to the upsampling step.

9. The method as recited in claim 8 further comprising the step of blanking the rasterizer when the audio data is invalid.

10. The method as recited in claim 6 or 7 further comprising the step of blanking the rasterizer when the audio data is invalid.

* * * * *